(12) United States Patent
Renaud et al.

(10) Patent No.: US 12,363,125 B2
(45) Date of Patent: Jul. 15, 2025

(54) SELECTIVE ACCESS TO COMPUTING SYSTEMS BASED ON AUTHENTICATION MECHANISMS

(71) Applicant: RED HAT, INC., Raleigh, NC (US)

(72) Inventors: Florence Renaud, Saint-Nazaire-les-Eymes (FR); Leigh Griffin, Warterford (IE)

(73) Assignee: Red Hat, Inc., Raleigh, NC (US)

( * ) Notice: Subject to any disclaimer, the term of this patent is extended or adjusted under 35 U.S.C. 154(b) by 223 days.

(21) Appl. No.: 18/084,643

(22) Filed: Dec. 20, 2022

(65) Prior Publication Data

US 2024/0205233 A1 Jun. 20, 2024

(51) Int. Cl.
*H04L 9/00* (2022.01)
*H04L 9/40* (2022.01)

(52) U.S. Cl.
CPC ............ *H04L 63/105* (2013.01); *H04L 63/08* (2013.01); *H04L 63/108* (2013.01)

(58) Field of Classification Search
CPC ..... H04L 63/10; H04L 63/105; H04L 63/108; H04L 63/08; H04L 63/0807
USPC .............................................. 726/4–5, 9–10
See application file for complete search history.

(56) References Cited

U.S. PATENT DOCUMENTS

| | | |
|---|---|---|
| 7,240,362 B2 | 7/2007 | Pfitzmann et al. |
| 7,657,639 B2 | 2/2010 | Hinton |
| 8,881,252 B2 * | 11/2014 | Van Till ............... H04L 63/08 726/5 |
| 10,341,325 B2 | 7/2019 | Xu et al. |
| 10,454,915 B2 | 10/2019 | Mohamad Abdul et al. |
| 10,944,738 B2 | 3/2021 | Rykowski et al. |
| 11,347,859 B2 | 5/2022 | Ahmed et al. |
| 11,750,397 B2 * | 9/2023 | Seaborn ............... H04L 63/083 726/5 |
| 2005/0050319 A1 * | 3/2005 | Suraski ............... H04L 63/10 726/4 |
| 2005/0114661 A1 * | 5/2005 | Cheng ............... G06F 21/6218 713/167 |

(Continued)

FOREIGN PATENT DOCUMENTS

CN 112039873 A 12/2020

*Primary Examiner* — Bharat Barot
(74) *Attorney, Agent, or Firm* — Kilpatrick Townsend & Stockton LLP

(57) ABSTRACT

A system can be provided that can determine a first subset of external identity providers associated with permitted access to software applications of an internal computing system. The system can also determine a second subset of external identity providers associated with denied access to the software applications. Additionally, the system can generate a mapping that associates permitted access to the software applications with the first subset of external identity providers and associates denied access to the software applications with the second subset of external identity providers. The system can further receive, from the user device, authentication data. The user device can obtain the authentication data using an external identity provider. The system can detect the external identity provider from the authentication data and, in response to detecting the external identity provider, the system can control access for the user device to the software applications based on the mapping.

20 Claims, 3 Drawing Sheets

(56) References Cited

U.S. PATENT DOCUMENTS

| | | | | |
|---|---|---|---|---|
| 2014/0380512 | A1* | 12/2014 | Sturtevant | H04L 63/0807 726/30 |
| 2021/0136083 | A1* | 5/2021 | Gordon | H04L 63/105 |
| 2021/0406806 | A1* | 12/2021 | Sadowski | G06Q 10/063114 |

* cited by examiner

SELECTIVE ACCESS TO COMPUTING SYSTEMS BASED ON AUTHENTICATION MECHANISMS

TECHNICAL FIELD

The present disclosure relates generally to identity management and, more particularly (although not necessarily exclusively), to selectively authorizing access for user devices to computing systems based on authentication mechanisms used to request access.

BACKGROUND

Identity management (IdM) is a framework for controlling access to technology resources. IdM can enable users to authenticate their identity with the technology resources via one or more mechanisms such as by providing a username and password, a certificate, a One-Time Password (OTP), etc. Thus, the user can provide information via the one or more mechanisms to request access to the technology resources or services (i.e., software applications) provided by the technology resources. The technology resources or services can verify the information to confirm the user's identity and determine whether to authorize the user (e.g., enable the user to access the technology resources or services).

DETAILED DESCRIPTION

Figure 1:
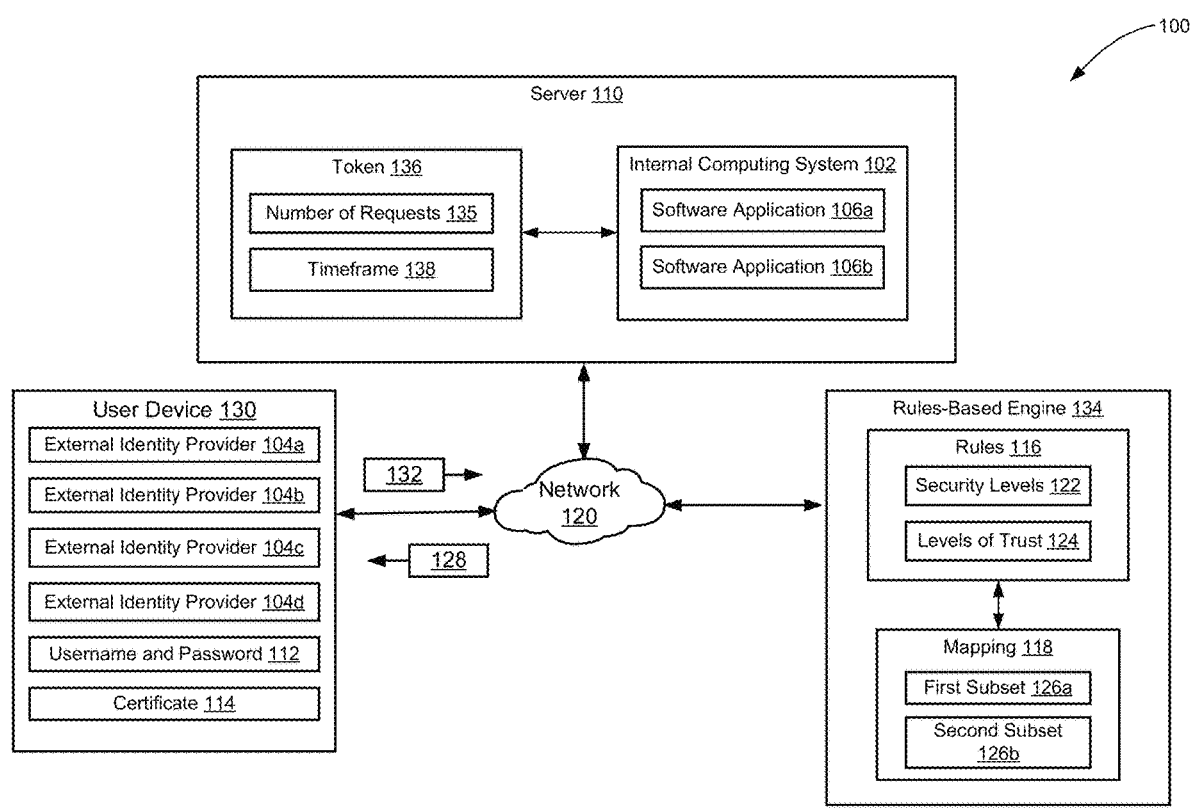
FIG. 1 is a block diagram of an example of a system for selectively authorizing access for user devices based on authentication mechanisms used to request access according to one example of the present disclosure.

Identity management (IdM) can enable a user to authenticate their identity with software applications or other suitable services via a username and password, a certificate, a One-Time password (OTP), external identity providers, or other suitable authentication mechanisms. Current systems may consider certain authentication mechanisms to be less secure than other authentication mechanisms. For example, the username and password alone can be an insecure authentication mechanism. A more secure authentication method may involve the user authenticating with the username and password and the OTP. However, conventional systems may not differentiate between different types of an authentication mechanism. Additionally, conventional systems may not control or limit access based on the type of authentication mechanism. For example, the conventional systems may provide the user equal access to software applications, services, etc. offered by an internal computing system for all external identity providers associated with the internal computing system. This can cause a security risk for the internal computing system as certain external identity providers may be less secure than other external identity providers. Additionally, the external identity providers may become more or less secure over time or security requirements of the internal computing system may change.

Some examples of the present disclosure can overcome one or more of the abovementioned problems by providing a system that can control access for a user device to software applications associated with the internal computing system. The system can control access based on an external identity provider used by the user device to authenticate with the internal computing system. The system can generate a mapping that associates external identity providers with the software applications. The mapping can include indications of whether each of the software applications can be accessed via each of the external identity providers. When the user device authenticates with the internal computing system via the external identity provider, the system can control access to particular software applications based on the mapping. Therefore, the system can facilitate precise control over which software applications the user device can access via the external identity provider to increase security for the internal computing system.

Additionally, predefined rules or another suitable mechanism can be used to assign levels of trust to the external identity providers or to determine security levels for the software applications. The levels of trust can be indications of security provided by the external identity providers. The security levels can be indications of security required to access the software applications based on data or other suitable information available in the software applications. The mapping can be generated based on the levels of trust and the security levels. Additionally, the mapping can be dynamic as the levels of trust, security levels, or a combination thereof may change. For example, data may become available in a software application that requires an increase in security for the software application. Therefore, the mapping may be adjusted to maintain a high level of security for the internal computing system.

As a more specific example, a first external identity provider can be Keycloak and a second external identity provider can be Github. Keycloack can be managed by an entity associated with the internal computing system while Github can be managed by a different entity. Thus, the system may establish a higher level of trust for Keycloak than for Github. Based on the higher level of trust, the system can determine that Keycloak can be associated with permitted access to a first software application and a second software application of the internal computing system. The system can further determine that the Github can be associated with permitted access to the first software application and can be associated with denied access to the second software application. The denied access can be due to the second software application requiring higher security than the first software application. The system can generate a mapping that associates the permitted access of the external identity providers to the first software application and associates the denied access of the second identity provider to the second software application. Additionally, the system may receive, from a user device, authentication data while the user device attempts to access either of the software applications. The system can detect that the authentication data was obtained by the user device via the second external identity provider. In response, the system can generate, based on the mapping, a token for the user device that indicates access to the first software application. The user device can then be provided access to the first software application due to the user device having the token. In addition, the user device may be denied access to the second software application.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for selectively authorizing access for a user device 130 based on authentication mechanisms used to request access according to one example of the present disclosure. The system 100 can include a server 110, a user device 130, and a rule-based engine 134, which can communicate via a network 120, such as a local area network (LAN) or the internet. The authentication mechanisms can include external identity providers 104a-d, a username and password 112, a certificate 114, or other suitable authentication mechanisms. The external identity providers 104a-d can be services for creating and maintaining identity information and can further provide authentication services for an internal computing system 102. For example, a user may be able to authenticate with the internal computing system 102 by logging into a user account with Google™, Github, Keyclock, or another suitable external identity provider via the user device 130.

In some examples, the rules-based engine 134 can be used by the system 100 to set or control which software applications 106a-b or other suitable aspects of the internal computing system 102 can be accessed by each of the external identity providers 104a-d. For example, the rules-based engine 134 can include rules 116 that can be used by the system 100 to determine or define security levels for the software applications 106a-b offered by the internal computing system 102. The rules 116 can also be used by the system 100 to determine or define levels of trust 124 for the external identity providers 104a-d. The levels of trust 124 can indicate security of the user device 130 authenticating with each of the external identity providers 104a-d. For example, a likelihood of an identity being a true identity of a user can be high for the user authenticating via a first external identity provider 104a. Therefore, the first external identity provider 104a can be associated with a high level of trust. Additionally, the security levels 122 can be associated with security requirements for accessing the software applications 106a-b. For example, a first software application 106a can include more sensitive data than a second software application 106b. Thus, a security level for the first software application 106a can be higher than the second software application 106b.

The system 100 can determine a first subset 126a of the external identity providers 104a-d associated with permitted access to the software applications 106a-b. For example, the first subset 126a can include the first external identity provider 104a and a second external identity provider 104b. The first subset 126a can be determined based on levels of trust 124 for the first external identity provider 104a and the second external identity provider 104b being sufficient with respect to security levels 122 for the software applications 106a-b. The system 100 can further determine a second subset 126b of the external identity providers 104a-d associated with denied access to the software applications 106a-b. The second subset 126b can include a third external identity provider 104c and a fourth external identity provider 104d. The second subset 126b can be determined based on levels of trust 124 for the third external identity provider 104c and the fourth external identity provider 104d being insufficient with respect to the security levels 122 for the software applications 106a-b.

Additionally, the system 100 can generate a mapping 118 that associates the permitted access of the first subset 126a with the software applications 106a-b. The mapping 118 may further associate the denied access of the second subset 126b with the software applications 106a-b. In some examples, the system 100 may receive an update to a security level of a software application, an update to a level of trust of an external identity provider, information indicative of the change in the security level or the level of trust, updated or additional rules, other suitable information, or a combination thereof. In response, the system 100 can, via the rules-based engine 134, automatically update the mapping 118. Therefore, the system 100 can provide the mapping 118 as a dynamic solution for efficiently permitting or denying access to the software applications 106a-b for the external identity providers 104a-d.

In an example, the system 100 can receive authentication data 132 from the user device 130. The user device 130 can obtain the authentication data 132 using the first external identity provider 104a. The first external identity provider 104a can be Keycloak and therefore the authentication data 132 can be user credentials for logging into a user account with Keycloak. The system 100 can detect that the first external identity provider 104a is in the first subset 126a. In some examples, the system 100 may detect that the first external identity provider 104a is in the first subset 126a based on the mapping 118.

The system 100 can further control access for the user device 130 based on the mapping 118. For example, in response to detecting the first external identity provider 104a is in the first subset 126a, the system 100 can authorize the user device 130 to access the software applications 106a-b based on the mapping 118 associating permitted access to the software applications 106a-b with the first subset. In some examples, the system 100 may control access for the user device 130 by generating a token 136 based on the mapping 118. The token 136 can be used by the user device 130 to authentication with the software applications 106a-b.

In some examples, the system 100 can provide restrictions for access by the user device 130 to the software applications 106a-b to improve security for the internal computing system 102. For example, the system 100 can provide a timeframe for which the token 136 can be valid. After the timeframe, the system 100 may transmit a request for the user device 130 to authenticate again with a same external identity provider, with another external identity provider with a higher level of trust, or with another authentication mechanism such as the certificate 114. In another example, the system 100 can provide a number of requests 135. The requests can be a number interactions with the software applications 106a-b. The number of requests 135 can be a threshold number of times the token 136 can be used by the user device 130 to access the software applications 106a-c. Similar to the above, after the number of requests 135, the system 100 may transmit a request for the user device 130 authenticate again.

Additionally, in some examples, the third external identity provider 104c and the fourth external identity provider 104d can be used for authentication with other software applications or services of the internal computing system 102. Additionally, in an example, the user device 130 can obtain authentication data 132 using the third external identity provider 104c. The user device 130 can transmit the authentication data 132 as a request to access the second software application 106b. The system 100 may detect that the third external identity provider 104c is part of the second subset 126b. In response, the system 100 may transmit a notification 128 to the user device 130 to notify the user device 130 of denied access to the second software application 106b. The notification 128 can further include a request for the user device 130 to provide authentication data 132 via one of the external identity providers 104a-b of the first subset 126a. The system 100 can formulate the request based on the mapping 118. Additionally, by indicating the first subset 126a to the user device 130, the notification 128 can enable the user device 130 to efficiently authenticate with the second software application 106b via the first external identity provider 104a or the second external identity provider 104b.

Although FIG. 1 depicts a certain number and arrangement of components, other examples may include more components, fewer components, different components, or a different number of the components that is shown in FIG. 1. For instance, the system 100 can include more external identity providers or authentication mechanisms than are shown in FIG. 1.

Figure 2:
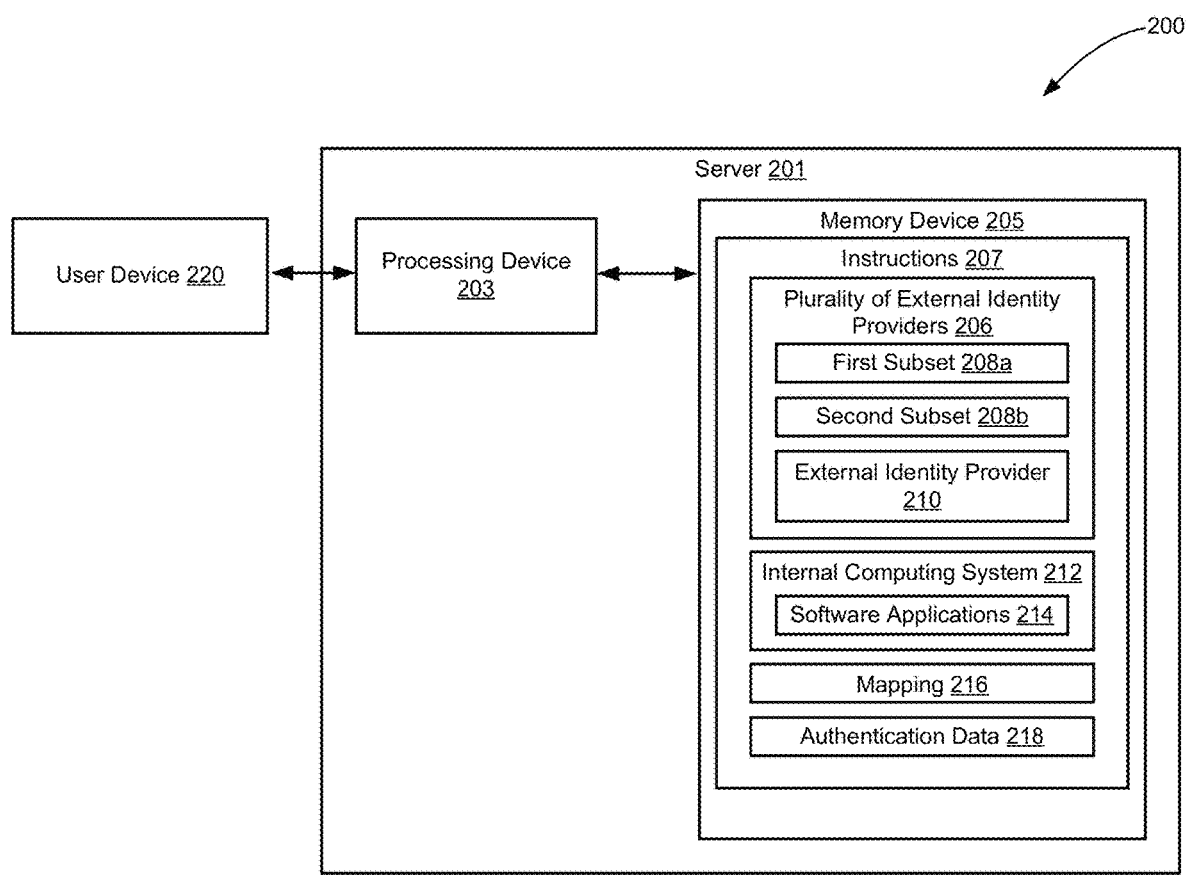
FIG. 2 is a block diagram of an example of a computing system for selectively authorizing access for user devices based on authentication mechanisms used to request access according to one example of the present disclosure.

FIG. 2 is a block diagram of an example of a computing system 200 selectively authorizing access for user devices based on authentication mechanisms used to request access according to one example of the present disclosure. The computing system 200 includes a processing device 203 that is communicatively coupled to a memory device 205. In some examples, the processing device 203 and the memory device 205 can be part of the same computing device, such as the server 201. In other examples, the processing device 203 and the memory device 205 can be distributed from (e.g., remote to) one another.

The processing device 203 can include one processor or multiple processors. Non-limiting examples of the processing device 203 include a Field-Programmable Gate Array (FPGA), an application-specific integrated circuit (ASIC), or a microprocessor. The processing device 203 can execute instructions 207 stored in the memory device 305 to perform operations. The instructions 207 may include processor-specific instructions generated by a compiler or an interpreter from code written in any suitable computer-programming language, such as C, C++, C #, Java, or Python.

The memory device 205 can include one memory or multiple memories. The memory device 205 can be volatile or non-volatile. Non-volatile memory includes any type of memory that retains stored information when powered off. Examples of the memory device 205 include electrically erasable and programmable read-only memory (EEPROM) or flash memory. At least some of the memory device 305 can include a non-transitory computer-readable medium from which the processing device 203 can read instructions 207. A non-transitory computer-readable medium can include electronic, optical, magnetic, or other storage devices capable of providing the processing device 203 with computer-readable instructions or other program code. Examples of a non-transitory computer-readable medium can include a magnetic disk, a memory chip, ROM, random-access memory (RAM), an ASIC, a configured processor, and optical storage.

The processing device 203 can execute the instructions 207 to perform operations. For example, the processing device 203 can determine a first subset 208a of external identity providers 206 associated with permitted access to one or more software applications 214 of an internal computing system 212. The first subset 208a of the external identity providers 206 can be used by a user device 220 to access the software applications 214. The processing device 203 can also determine a second subset 208b of the external identity providers 206 associated with denied access to the software applications 214 of the internal computing system 212. The processing device 203 can further generate a mapping 216 that associates permitted access to the software applications 214 with the first subset 208a and associates denied access to the software applications 214 with the second subset 208b. Additionally, the processing device 203 can receive, from the user device 220, authentication data 218. The user device 220 can transmit the authentication data 218 obtained using an external identity provider 210 of the external identity providers 206. The processing device 203 can detect the external identity provider 210 from which the authentication data 218 was received and, in response to detecting the external identity provider 210, the processing device 203 can control access for the user device 220 to the software applications 214 based on the mapping 216. Therefore, the processing device 203 can enable selective access to the software applications 214 based on the external identity providers 206 which can improve security for the internal computing system.

Figure 3:
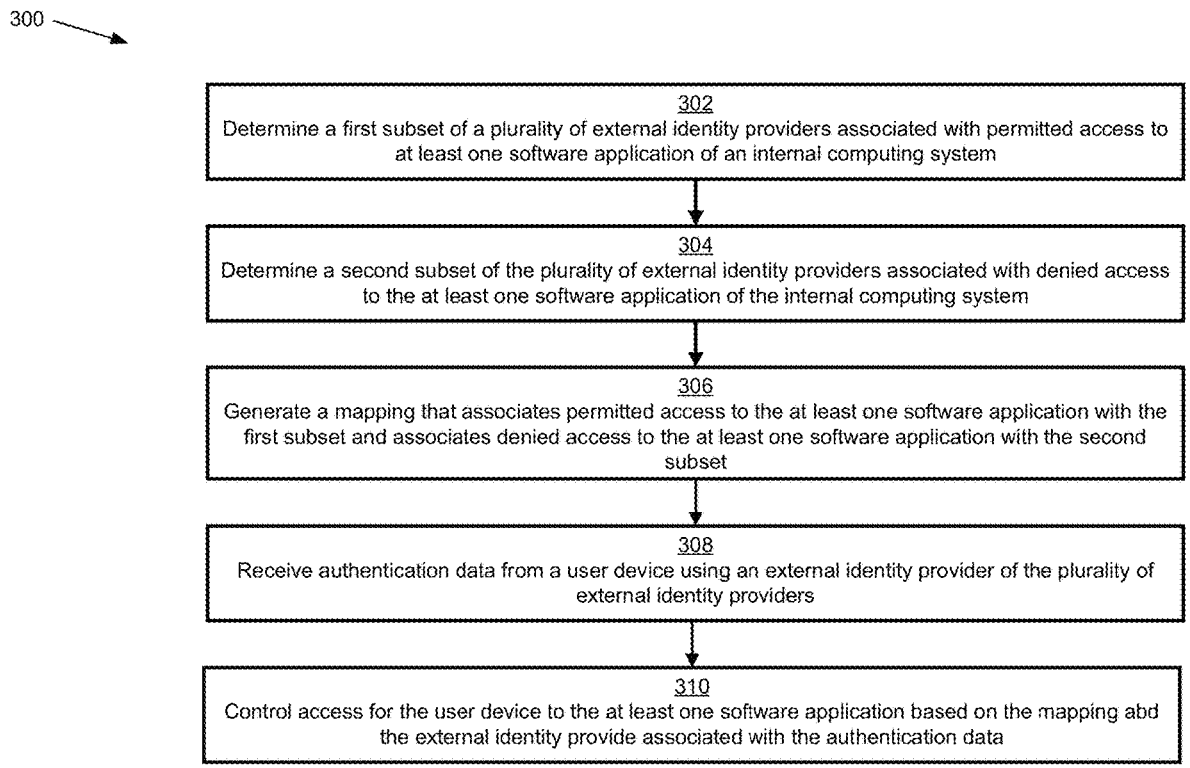
FIG. 3 is a flowchart of a process for selectively authorizing access for user devices based on authentication mechanisms used to request access according to one example of the present disclosure.

FIG. 3 is a flowchart of a process selectively authorizing access for user devices based on authentication mechanisms used to request access according to one example of the present disclosure. In some examples, a processing device 203 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1 and 2.

At block 302, the processing device 203 can determine a first subset 126a of a plurality of external identity providers 104a-d associated with permitted access to at least one software application 106a-b of an internal computing system 102. The first subset 126a of the external identity providers 104a-d can be used by a user device 130 to access the software applications 106a-b. The processing device 203 may determine the first subset 126a based on rules 116 stored in a rules-based engine 134. For example, the rules 116 can be used to determine levels of trust 124 for the external identity providers 104a-b. Additionally, the rules 116 can be used to determine security levels 122 for the software applications 106a-b. The first subset 126a can be a subset of the external identity providers 104a-d with sufficient levels of trust 124 for the security levels 122 of the software applications 106a-b.

At block 304, the processing device 203 can determine a second subset 126b of the plurality of external identity providers 104a-d associated with denied access to the at least one software application 106a-b of the internal computing system 102. The processing device 203 may determine the second subset 126b based on the rules 116 stored in the rules-based engine 134. For example, the second subset 126b can be a subset of the external identity providers 104a-d with insufficient levels of trust 124 for the security levels 122 of the software applications 106a-b.

At block 306, the processing device 203 can generate a mapping 118 that associates permitted access to the at least one software application 106a-b with the first subset 126a and associates denied access to the at least one software application 106a-b with the second subset 126b. In some examples, the processing device 203 may receive an update to a security level for a software application or the processing device 203 may receive an update to a level of trust for an external identity provider. The processing device 203 can automatically adjust the first subset 126a or the second subset 126b and can further automatically adjust the mapping 118 based on the update to the security level or the update to the level of trust.

At block 308, the processing device 203 can receive authentication data 132 from the user device 130 using an external identity provider of the plurality of external identity providers. For example, the user device 130 can transmit the authentication data 132 obtained via a first external identity provider 104a. The authentication data 132 can be login credentials, such as a username and password, for a user account associated with the first external identity provider 104a. The mapping 118 can indicate that the first external identity provider 104a can be included in the first subset 126a.

In some examples, the processing device 203 can further detect the external identity provider from which the authentication data 132 was received. The processing device 203 may detect the first external identity provider 104a based the authentication data 132. For example, the authentication data 132 received by the processing device 203 can include an indicator for the first external identity provider 104a.

At block 310, the processing device 203 can control access for the user device 130 to the at least one software application 106a-b based on the mapping 118 and the external identity provider associated with the authentication data 132. The processing device 203 may control access for the user device in response to detecting the external identity provider. For example, the processing device 203 can detect the first external identity provider 104a is included in the first subset 126a. Therefore, the processing device 203 can permit access for the user device 130 to the software applications 106a-b based on the mapping 118 associating the first external identity provider 104a with permitted access.

In some examples, the processing device 203 may control access for the user device 130 by generating a token 136 indicating the software applications 106a-b accessible by the first external identity provider 104a based on the mapping 118. The token 136 can be used by the user device 130 to access the software applications 106a-b. In an example, the processing device 203 may further provide a timeframe 138 for which the token 136 can be valid to enable the user device 130 to access the software applications 106a-b during the timeframe 138. In another example, the processing device 203 may provide a threshold number of requests that can be used by the user device 130 to interact with the software applications 106a-b. After the user device 130 makes a number of requests 135 exceeding the threshold number of requests or after the timeframe 138, the processing device 203 may request additional authentication data from the user device 130.

Additionally or alternatively, the user device 130 may transmit authentication data via a third external identity provider 104c. The processing device 203 may detect that the third external identity provide 104c is included in the second subset 126b. Thus, the processing device 203 may deny the user device 130 access to the at least one software application and transmit, to the user device 130, a notification 128 of denied access to the software applications 106a-b based on the third external identity provider 104c being included in the second subset. The notification 128 can further include a request for second authentication data from the user device 130. The request for the second authentication data may indicate the first external identity provider or another external identity provide of the first subset 126a. Then, the processing device 203 may receive, from the user device 130, the second authentication data and can permit access based on the second authentication data being valid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
determining a first subset of a plurality of external identity providers associated with permitted access to at least one software application of an internal computing system, each external identity provider of the plurality of external identity providers being an external service usable to authenticate with the internal computing system;
determining a second subset of the plurality of external identity providers associated with denied access to the at least one software application of the internal computing system;
generating a mapping that associates permitted access to the at least one software application with the first subset and associates denied access to the at least one software application with the second subset;
receiving authentication data from a user device using an external identity provider of the plurality of external identity providers; and
controlling access for the user device to the at least one software application by using the mapping to determine whether the external identity provider is in the first subset associated with permitted access to the at least one software application or the second subset associated with denied access to the at least one software application.

2. The system of claim 1, wherein the memory device includes instructions executable by the processing device for causing the processing device to:
determine, based on the mapping, that the external identity provider is included in the first subset of the plurality of external identity providers; and
in response determining that the external identity provider is included in the first subset, generate a token indicating the external identity provider based on the mapping, the token usable by the user device to access the at least one software application.

3. The system of claim 2, wherein the memory device includes instructions executable by the processing device for causing the processing device to control access for the user device to the at least one software application by:
providing a timeframe for which the token is valid to enable the user device to access the at least one software application during the timeframe.

4. The system of claim 1, wherein the memory device includes instructions executable by the processing device for causing the processing device to control access for the user device to the at least one software application by:
providing a threshold number of requests permitted to be used by the user device to interact with the at least one software application prior to receiving additional authentication data from the user device.

5. The system of claim 1, wherein the authentication data is first authentication data and the external identity provider is a first external identity provider, and the memory device includes instructions executable by the processing device for causing the processing device to:
determine, based on the mapping, that the first external identity provider is included in the second subset of the plurality of external identity providers;
transmit, to the user device, a notification of denied access to the at least one software application based on the first external identity provider being included in the second subset, the notification including a request for second authentication data and an indication of a second external identity provider of the plurality of external identity providers usable to access the at least one software application based on the mapping; and
receive, from the user device, the second authentication data via the second external identity provider.

6. The system of claim 1, wherein the memory device includes instructions executable by the processing device for causing the processing device to:
receive an update to a security level for a software application of the at least one software application; and
adjust the mapping based on the update.

7. The system of claim 1, wherein the external identity provider is a first external identity provider, and the memory device includes instructions executable by the processing device for causing the processing device to:
receive an update to a level of trust for a second external identity provider of the plurality of external identity providers; and
adjust the mapping based on the update.

8. A method comprising:
determining a first subset of a plurality of external identity providers associated with permitted access to at least one software application of an internal computing system, each external identity provider of the plurality of external identity providers being an external service usable to authenticate with the internal computing system;
determining a second subset of the plurality of external identity providers associated with denied access to the at least one software application of the internal computing system;
generating a mapping that associates permitted access to the at least one software application with the first subset and associates denied access to the at least one software application with the second subset;
receiving authentication data from a user device using an external identity provider of the plurality of external identity providers; and
controlling access for the user device to the at least one software application by using the mapping to determine whether the external identity provider is in the first subset associated with permitted access to the at least one software application or the second subset associated with denied access to the at least one software application.

9. The method of claim 8, further comprising:
determining, based on the mapping, that the external identity provider is included in the first subset of the plurality of external identity providers; and
in response determining that the external identity provider is included in the first subset, generating a token indicating the external identity provider based on the mapping, the token usable by the user device to access the at least one software application.

10. The method of claim 9, wherein controlling access for the user device to the at least one software application further comprises:
providing a timeframe for which the token is valid to enable the user device to access the at least one software application during the timeframe.

11. The method of claim 8, wherein controlling access for the user device to the at least one software application further comprises:
providing a threshold number of requests permitted to be used by the user device to interact with the at least one software application prior to receiving additional authentication data from the user device.

12. The method of claim 8, wherein the authentication data is first authentication data and the external identity provider is a first external identity provider, and the method further comprises:
determining, based on the mapping, that the first external identity provider is included in the second subset of the plurality of external identity providers;
transmitting, to the user device, a notification of denied access to the at least one software application based on the first external identity provider being included in the second subset, the notification including a request for second authentication data and an indication of a second external identity provider of the plurality of external identity providers usable to access the at least one software application based on the mapping; and
receiving, from the user device, the second authentication data via the second external identity provider.

13. The method of claim 8, further comprising:
receiving an update to a security level for a software application of the at least one software application; and
adjusting the mapping based on the update.

14. The system of claim 8, further comprising:
receiving an update to a level of trust for an external identity provider of the plurality of external identity providers; and
adjusting the mapping based on the update.

15. A non-transitory computer-readable medium comprising instructions that are executable by a processing device for causing the processing device to perform operations comprising:
determining a first subset of a plurality of external identity providers associated with permitted access to at least one software application of an internal computing system, each external identity provider of the plurality of external identity providers being an external service usable to authenticate with the internal computing system;
determining a second subset of the plurality of external identity providers associated with denied access to the at least one software application of the internal computing system;
generating a mapping that associates permitted access to the at least one software application with the first subset and associates denied access to the at least one software application with the second subset;
receiving authentication data from a user device using an external identity provider of the plurality of external identity providers; and
controlling access for the user device to the at least one software application by using the mapping to determine whether the external identity provider is in the first subset associated with permitted access to the at least one software application or the second subset associated with denied access to the at least one software application.

16. The non-transitory computer-readable medium of claim 15, further comprising instructions that are executable by the processing device for causing the processing device to:
   determine, based on the mapping, that the external identity provider is included in the first subset of the plurality of external identity providers; and
   in response determining that the external identity provider is included in the first subset, generate a token indicating the external identity provider based on the mapping, the token usable by the user device to access the at least one software application.

17. The non-transitory computer-readable medium of claim 16, further comprising instructions that are executable by the processing device for causing the processing device to control access for the user device to the at least one software application by:
   providing a timeframe for which the token is valid to enable the user device to access the at least one software application during the timeframe.

18. The non-transitory computer-readable medium of claim 15, further comprising instructions that are executable by the processing device for causing the processing device to control access for the user device to the at least one software application by:
   providing a threshold number of requests permitted to be used by the user device to interact with the at least one software application prior to receiving additional authentication data from the user device.

19. The non-transitory computer-readable medium of claim 15, wherein the authentication data is first authentication data and the external identity provider is a first external identity provider, and further comprising instructions that are executable by the processing device for causing the processing device to:
   determine, based on the mapping that the first external identity provider is included in the second subset of the plurality of external identity providers;
   transmit, to the user device, a notification of denied access to the at least one software application based on the first external identity provider being included in the second subset, the notification including a request for second authentication data, and an indication of a second external identity provider of the plurality of external identity providers usable to access the at least one software application based on the mapping; and
   receive, from the user device, the second authentication data via the second external identity provider.

20. The non-transitory computer-readable medium of claim 15, further comprising instructions that are executable by the processing device for causing the processing device to:
   receive an update to a security level for a software application of the at least one software application; and
   adjusting the mapping based on the update.

* * * * *